United States Patent
Poupinet et al.

(10) Patent No.: US 7,582,346 B2
(45) Date of Patent: *Sep. 1, 2009

(54) INORGANIC OPTICAL RECORDING MEDIUM COMPRISING A HEAT DISSIPATION LAYER

(75) Inventors: Ludovic Poupinet, Sassenage (FR); Bérangère Hyot, Grenoble (FR); Marie-Françoise Armand, Vaulnaveys-le-Haut (FR)

(73) Assignees: Commissariat a l'Energie Atomique, Paris (FR); MPO International, Averton (FR)

( * ) Notice: Subject to any disclaimer, the term of this patent is extended or adjusted under 35 U.S.C. 154(b) by 500 days.

This patent is subject to a terminal disclaimer.

(21) Appl. No.: 10/535,411

(22) PCT Filed: Dec. 2, 2003

(86) PCT No.: PCT/FR03/03548

§ 371 (c)(1),
(2), (4) Date: Nov. 7, 2005

(87) PCT Pub. No.: WO2004/053859

PCT Pub. Date: Jun. 24, 2004

(65) Prior Publication Data

US 2006/0136956 A1    Jun. 22, 2006

(30) Foreign Application Priority Data

Dec. 3, 2002   (FR) .................................. 02 15196

(51) Int. Cl.
*B32B 3/02*   (2006.01)
(52) U.S. Cl. ................ 428/64.4; 428/64.5; 430/270.12; 430/270.13

(58) Field of Classification Search ................ 428/64.5, 428/64.6, 64.4; 430/270.13, 270.12
See application file for complete search history.

(56) References Cited

U.S. PATENT DOCUMENTS 4,214,249 A    7/1980  Kasai et al.

(Continued)

FOREIGN PATENT DOCUMENTS

EP    387016 A2 *   9/1990

(Continued)

OTHER PUBLICATIONS

Terao et al., "Chalcogenide Thin Films for Laser-beam Recordings by Thermal Creation of Holes," J. Appl. Phys, vol. 50, No. 11, pp. 6881-6886.

*Primary Examiner*—Elizabeth Mulvaney
(74) *Attorney, Agent, or Firm*—Oliff & Berridge, PLC

(57) ABSTRACT

The optical recording medium comprises an active layer of inorganic material, able to undergo deformations due to the effect of an optical radiation, presenting a front face designed to receive an optical radiation during writing operations and a rear face. An additional metal layer is arranged on the rear face of the active layer. The additional metal layer preferably has a thickness comprised between 9 nanometers and 12 nanometers. The inorganic material of the active layer can be a tellurium and zinc alloy comprising an atomic percentage of between 60% and 70% of zinc and between 30% and 40% of tellurium, and preferably 65% of zinc and 35% of tellurium. The medium can comprise a semi-reflecting layer arranged on the front face of the active layer and/or a protective layer made of polymer material on the rear face.

12 Claims, 1 Drawing Sheet

U.S. PATENT DOCUMENTS

| | | |
|---|---|---|
| 4,398,203 A | 8/1983 | Cornet |
| 4,969,141 A | 11/1990 | Takaoka et al. |
| 6,379,767 B1 * | 4/2002 | Park et al. .................. 428/64.1 |
| 6,506,469 B2 * | 1/2003 | Takahashi et al. .......... 428/64.1 |
| 6,544,616 B2 * | 4/2003 | Nee ........................... 428/64.1 |
| 7,009,930 B1 | 3/2006 | Uno et al. |
| 7,181,753 B2 | 2/2007 | Poupinet et al. |
| 2003/0090991 A1 | 5/2003 | Poupinet et al. |

FOREIGN PATENT DOCUMENTS

| | | |
|---|---|---|
| EP | 0747895 A2 | 12/1996 |
| EP | 1 054 393 A2 | 11/2000 |
| FR | 2 809 856 A1 | 12/2001 |
| JP | A-52-115202 | 9/1977 |
| JP | A-57-55540 | 4/1982 |
| JP | 62278091 A * | 12/1987 |
| JP | A-63-39387 | 2/1988 |
| JP | 01287838 A * | 11/1989 |
| JP | 03-165341 * | 7/1991 |
| JP | A-8-329520 | 12/1996 |
| JP | A-9-134544 | 5/1997 |
| JP | A-2001-180113 | 7/2001 |
| WO | WO 01/46950 A1 | 6/2001 |
| WO | WO 01/93256 A1 | 12/2001 |

* cited by examiner

INORGANIC OPTICAL RECORDING MEDIUM COMPRISING A HEAT DISSIPATION LAYER

BACKGROUND OF THE INVENTION

The invention relates to an optical recording medium comprising an active layer of inorganic material able to undergo deformations due to the effect of an optical radiation, presenting a front face designed to receive an optical radiation during writing operations, and a rear face.

STATE OF THE ART

Optical recording can be performed in colorant materials (for example in CD-R: compact disk recordable and DVD-R: digital versatile disk recordable type applications), but also in inorganic materials. The latter present an advantage in terms of production cost and performances at high linear speeds. There are different methods of writing in a layer of inorganic material. The irreversible technique the most widely studied in the 80's consists in forming marks by laser ablation. The presence of the mark results in a local reduction of the reflection of a laser beam on the surface of the disk. This reduction of the reflection is read with a lower laser power. Even if most of the studies on ablation mechanisms concerned tellurium alone, other materials were envisaged, for example alloys containing arsenic, antinomy, selenium and sulphur, proposed in the article "Chalcogenide thin films for laser-beam recordings by thermal creation of holes" by M. Terao et Al. (J. Appl. Phys. 50 (11), November 1979). However in most of these studies, high powers were used, in particular by M. Terao et Al. The tests carried out at the time therefore did not correspond to the current writing specifications. Indeed, the powers used were in fact comprised between 40 mW and 300 mW and the dimensions of the marks were about 10 µm, whereas the writing powers used to write a DVD-R have to be about 10 mW and the dimension of a mark has to be about 400 nm in diameter. Moreover, it is often necessary to deposit a protective layer, for example of polymer, on the recording medium. However, the presence of a protective layer generally causes a degradation of the quality of the signals and an increase of the writing power. Many materials were studied, but few enable good quality writing, in particular tellurium and its alloys with germanium, selenium and antimony. Unfortunately, these alloys do not enable the storage densities required for DVD format to be achieved. This is why colorants imposed themselves for this standard. However, irreversible optical recording technologies in colorant materials sometimes present high costs, in particular the prices of the colorants and the manpower costs for the colorant handling stages.

OBJECT OF THE INVENTION

The object of the invention is to remedy these shortcomings and, more particularly, to propose an inorganic medium enabling a mark resolution and storage density corresponding to DVD format specifications to be achieved.

According to the invention, this object is achieved by the fact that an additional metal layer preferably having a thickness comprised between 9 nanometers and 12 nanometers is deposited on the rear face of the inorganic active layer.

According to a development of the invention, the inorganic material of the active layer is a tellurium and zinc alloy comprising an atomic percentage of between 60% and 70% of zinc and between 30% and 40% of tellurium, and preferably 65% of zinc and 35% of tellurium.

According to a development of the invention, the medium comprises a semi-reflecting layer arranged on the front face of the active layer and having a thickness comprised between 4 nanometers and 10 nanometers.

According to a preferred embodiment, the recording medium comprises a protective layer of polymer material on the rear face.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
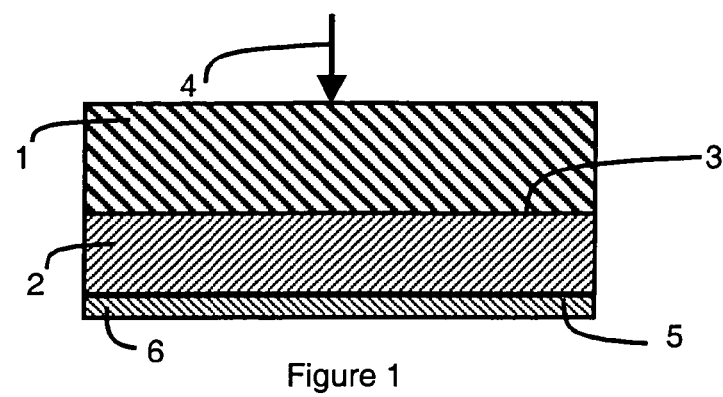
FIG. 1 represents a particular embodiment of an optical recording medium according to the invention.

In FIG. 1, an optical recording medium comprises a substrate 1 and an active layer 2 made of inorganic material able to undergo deformations due to the effect of an optical radiation and presenting a front face 3 for receiving an optical radiation 4 during writing operations, and a rear face 5. These mechanical deformations can for example be holes or bubbles. The medium can be read on both sides, i.e. the active layer 2 can receive an optical radiation, during reading operations, on the front face 3 or on the rear face 5 thereof. The substrate 1 is arranged on the front face 3 of the active layer 2. Typically, the active layer 2 is deposited on a plastic substrate, for example made of polycarbonate. The recording medium comprises an additional metal layer 6 arranged on the rear face 5 of the active layer 2. The additional metal layer 6 enables the heat dissipation in the active layer 2 when writing operations are performed to be increased. Thus, the active layer 2 is cooled more quickly, in particular on the rear face. This limits the deformation undergone by the molten material during creation of a mark and therefore limits the final size of the marks. The optical recording medium can in particular be of irreversible type.

In a preferred embodiment, the additional metal layer 6 has a thickness comprised between 9 nanometers and 12 nanometers. The preferred thickness of the additional metal layer 6 is 10 nanometers. The essential property of the additional metal layer 6 is thermal conductivity. The material of the additional metal layer 6 is preferably taken from the group comprising aluminium, gold, silver, copper and alloys thereof. These metals are in fact good heat conductors among the standard thin film technology materials.

The medium comprising the active layer 2 and the additional metal layer 6 enables writing operations to be performed with a power compatible with the powers required by writing standards. Thus, the dimension of the marks does not exceed the dimension required by the writing specifications. By applying higher writing powers, the size of the marks increases and exceeds the tolerated dimension.

A consequence of the presence of the additional metal layer 6 of small thickness can be the reduction of the reflection of the whole of the medium, unlike a thicker metal layer (about 100 nanometers), which is sometimes arranged, to increase the reflection, on the rear face of the organic active layer in organic colorant-based technologies. The interface between a metal layer and an organic layer in fact presents different reflection properties of the interface between the active layer 2 made of inorganic material and the additional metal layer 6, because the organic layer is transparent, whereas the inorganic active layer 2 made of alloy is opaque.

In a preferred embodiment, the inorganic material of the active layer 2 is a tellurium and zinc alloy comprising an atomic percentage of between 60% and 70% of zinc and between 30% and 40% of tellurium. This alloy presents advantageous properties for formation of marks by laser, for example deformation of the layer, formation of a bubble and formation of a hole. In a preferred embodiment, the alloy comprises 65% of zinc and 35% of tellurium. The active layer preferably has a thickness comprised between 15 nanometers and 50 nanometers. The thickness has to be adjusted to enable a reasonable writing power with a sufficient reflection to be preserved. The marks, for example holes or cavities, do in fact have to be sufficiently large to create the required reflection contrast but not too large in order to limit the reading noise. But the size of the marks in fact increases with the thickness of the layer. In a preferred embodiment, the thickness of the active layer 2 is comprised between 20 nanometers and 25 nanometers enabling a reflection coefficient comprised between 15% and 20% to be obtained. In another preferred embodiment, the thickness of the active layer 2 is 40 nanometers enabling a reflection coefficient comprised between 25% and 35% to be obtained.

Figure 2:
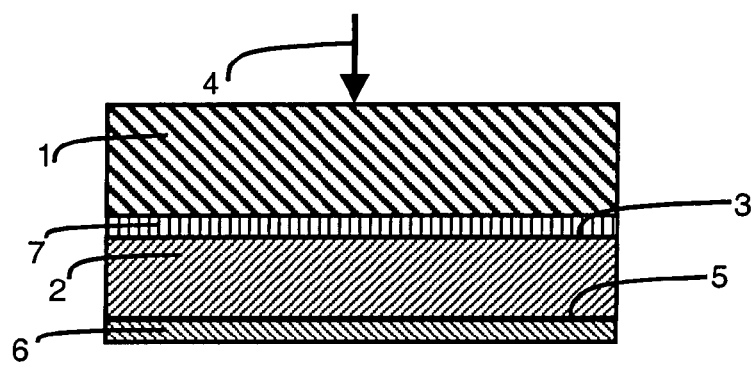
FIG. 2 represents a particular embodiment of a medium according to the invention comprising a semi-reflecting layer.

As represented in FIG. 2, the optical recording medium can comprise a semi-reflecting layer 7 arranged on the front face 3 of the active layer 2. It is preferable for this layer to absorb little light. As the optical radiation having to reach the active layer 2 passes through the semi-reflecting layer 7, the thickness of the latter has to be adjusted as best as possible to increase the reflection without increasing the write threshold excessively. The semi-reflecting layer 7 has a thickness comprised between 4 nanometers and 10 nanometers. In this way, the reflection coefficient of the whole of the active layer 2 and of the semi-reflecting layer 7 can be adapted to the detection device.

In a preferred embodiment, the semi-reflecting layer 7 is made from a metal taken from the group comprising aluminium, gold, silver, copper, zinc, titanium, nickel and alloys thereof. These metals form part of the standard thin film technology materials being able to present sufficiently high reflection and transmission coefficients in the range of wavelengths typically used for reading operations. Aluminium seems to be a particularly suitable metal, on account of the fact that it presents a strong reflection throughout the optical spectrum.

Figure 3:
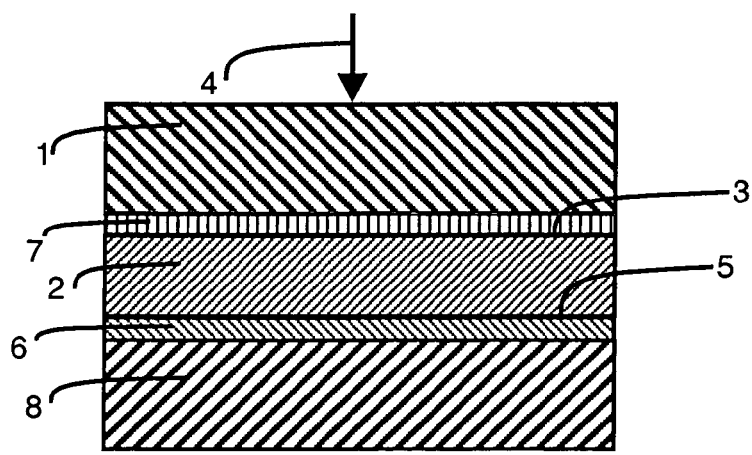
FIG. 3 represents a particular embodiment of a medium according to the invention comprising a protective layer.

In FIG. 3, the optical recording medium comprises, in addition, a protective layer 8, preferably made of deformable material, for example polymer material, on the rear face 5, enabling the disk to be protected from physico-chemical modifications of the materials, for example oxidation, and from mechanical modifications, for example scratches. The protective layer 8 is preferably polydimethylsiloxane-based and has a thickness preferably comprised between 10 micrometers and 100 micrometers. Assembly of the protective layer 8 and of a medium comprising an active layer 2 of zinc and tellurium alloy with the percentages according to the invention is easy to implement and the presence of a polymer layer does not cause any degradation of the writing signal. The layer 8 can be replaced by a gluing layer with a thickness of 20 to 100 micrometers whereon there is arranged a plastic layer, for example a layer of polycarbonate with a thickness of 0.6 mm.

Optical recording media according to the invention have been tested under conditions corresponding to the DVD-R standard. Thus, marks with a minimum length of 400 nm and a maximum length of 1866 nm were etched by optical radiation pulses of corresponding durations, notably with a minimum duration of 3T and a maximum duration of 14T, where T is the optical signal generator clock pulse time. As the length of the marks is smaller than the wavelength of the optical radiation used, it is not possible to measure the length of the marks by observation under a microscope. However the length of the marks can be deduced, in known manner, from the quantity of radiation reflected by a sequence of marks scanned by an optical radiation. Thus, a histogram of the lengths of the measured marks can be established. The standard deviation of each histogram (jitter) of the minimum marks (3T) and maximum marks (14T) is less than 8%.

The invention claimed is:

1. An optical recording medium comprising:
   an active layer of inorganic material able to undergo deformations due to the effect of an optical radiation, presenting a front face designed to receive an optical radiation during writing operations, and a rear face;
   and an additional metal layer in contact with the rear face of the active layer;
   wherein the inorganic material of the active layer is a tellurium and zinc alloy consisting of only an atomic percentage of between 60% and 70% of zinc and between 30% and 40% of tellurium.

2. Recording medium according to claim 1, wherein the additional metal layer has a thickness comprised between 9 nanometers and 12 nanometers.

3. Recording medium according to claim 1, wherein the material of the additional metal layer is taken from the group comprising aluminium, gold, silver and copper.

4. Recording medium according to claim 1, wherein the alloy comprises 65% of zinc and 35% of tellurium.

5. Recording medium according claim 1, wherein the active layer has a thickness comprised between 15 nanometers and 50 nanometers.

6. Recording medium according to claim 1, comprising a semi-reflecting layer arranged on the front face of the active layer and having a thickness comprised between 4 nanometers and 10 nanometers.

7. Recording medium according to claim 6, wherein the semi-reflecting layer is made of metal taken from the group comprising aluminium, gold, silver, copper, zinc, titanium, nickel and alloys thereof.

8. Recording medium according to claim 1, comprising a protective layer made of polymer material on the rear face.

9. Recording medium according to claim 8, wherein the protective layer is polydimethylsiloxane-based and has a thickness comprised between 10 micrometers and 100 micrometers.

10. Recording medium according to claim 8, wherein the protective layer is deformable.

11. Recording medium according to claim 1, wherein the additional metal layer has a front face, in contact with the rear face of the active layer, and a rear face that constitutes an exposed rear face of the optical recording medium.

12. Recording medium according to claim 1, wherein the recording medium consists of only a substrate, a single active layer, and the additional metal layer.

* * * * *